United States Patent [19]
Schmidt et al.

[11] Patent Number: 6,045,147
[45] Date of Patent: Apr. 4, 2000

[54] LIFT UNIT FOR WEIGHT DISTRIBUTING TRAILER HITCH

[75] Inventors: Kenneth R. Schmidt, Canton; Eric B. Michalak, Westland, both of Mich.

[73] Assignee: Draw-Tite, Inc., Canton, Mich.

[21] Appl. No.: 08/957,840

[22] Filed: Oct. 27, 1997

Related U.S. Application Data

[60] Provisional application No. 60/029,826, Oct. 28, 1996.

[51] Int. Cl.⁷ .............................. B60P 1/14; B62D 53/00
[52] U.S. Cl. ........................................................ 280/406.1
[58] Field of Search ............................ 280/405.1, 406.1, 280/406.2, 407, 407.1, 456.1, 459; 403/330

[56] References Cited

U.S. PATENT DOCUMENTS

| D. 213,616 | 3/1969 | Block et al. ........................ 280/406.2 |
|---|---|---|
| 535,307 | 3/1895 | Stockin . |
| 1,140,757 | 5/1915 | Meyer . |
| 2,817,541 | 12/1957 | Mathisen . |
| 2,828,143 | 3/1958 | Da Vatz . |
| 3,185,499 | 5/1965 | Reese . |
| 3,756,618 | 9/1973 | Lewis . |
| 4,815,752 | 3/1989 | Young et al. . |

OTHER PUBLICATIONS

Copy of brochure—Installation Instructions 3200 Weight Distributing Hitch System.
1996 Reese Products, Applications, Towing Accessories Catalog pp. 1,9,11–15 & 38–41.
1995 Draw–Tite Catalog, pp. 1, 2, 4–8, 47, 117.

Primary Examiner—Kevin Hurley
Assistant Examiner—Andrew J. Fischer
Attorney, Agent, or Firm—Leon E. Redman; Lloyd D. Doigan

[57] ABSTRACT

The lift unit for a weight distributing trailer hitch includes a fixed mounting bracket secured to the trailer tongue and a chain lift bracket that pivots on the mounting bracket to raise and lower a chain for flexing and unflexing a spring bar that distributes weight between the towing vehicle and the trailer with the spring bar in the flexed position. A locking pawl rotatably connected to the lift bracket has a lower arm portion for engagement with a detent in the fixed mounting bracket to releasably latch the lift bracket in a raised position. The locking pawl also includes an upper arm projection. The locking pawl is connected to the lift bracket with the pawl upper arm projection positioned adjacent a tool engagement finger on the lift bracket that is slidably engaged by a tool such as a pipe to aid in raising and lowering the chain lift bracket. Upon engagement of the tool with the tool engagement finger, the tool also engages the upper arm projection of the pawl to rotate the lower arm portion away from engagement with the detent in the mounting bracket and unlatch the lift bracket to lower the chain and unflex the spring bar.

4 Claims, 6 Drawing Sheets

LIFT UNIT FOR WEIGHT DISTRIBUTING TRAILER HITCH

This application claims priority from U.S. Provisional Application No. 60/029,826 filed on Oct. 28, 1996.

TECHNICAL FIELD

The present invention relates generally to the trailer towing field and more particularly to a lift unit for a weight distributing trailer hitch with an improved lift unit and method of operating the lift unit to hook up a spring bar of a weight distributing hitch to a trailer.

BACKGROUND OF THE INVENTION

Weight distributing trailer hitches are well known in the art to distribute the weight of the trailer relative to the tow vehicle. Such weight distributing hitches typically employ a cantilevered spring bar mounted in a ball mount hitch head attached to a towing vehicle. Flexing of the spring bar is accomplished by elevating its distal end upwardly toward the trailer tongue via a lift bracket mounted on the side of the trailer tongue. Typically, the lift bracket hooks a selected link of chain attached at the rearward end of the spring bar so operation of the lift unit pulls upward on the rearward end of the spring bar flexing the spring bar to a desired degree of flex.

A representative example of an improved weight distributing hitch assembly is shown and described in copending U.S. patent application Ser. No. 60/029,361 filed Oct. 28, 1996 entitled Weight Distributing Hitch Assembly, and design application Ser. No. 29/061,687 Oct. 28, 1996 entitled Ball Mount Head for a Weight Distributing Hitch.

A representative example of an improved lift unit for a weight distributing trailer hitch is disclosed in U.S. Pat. No. 4,815,752. A lift unit which embodies the invention disclosed in this patent and has achieved great commercial success is sold by Draw-Tite, Inc. under the trademark LIFT-LOCK® and part No. 3227. This lift unit includes a bracket member that is securely fastened to the frame of the trailer tongue, and a hinge member pivotally joined to the bracket member. A chain engaging hook is welded to the hinge member. A handle engaging hook is welded onto the hinge member above the chain engaging hook. The handle engaging member receives a handle tool to aid in rotating the hinge bracket to raise and lower it to flex and unflex the spring bar. A gravity responsive locking pawl is pivotally connected to the hinge member so that the bottom edge of the pawl rests in a notch on a top edge of the bracket member to restrain the hinge member once the spring bar has been flexed upon sufficient upward rotation of the hinge member via the handle tool which engages the handle hook. A cotter pin is manually inserted through aligned apertures in the pawl and the hinge member to lock the pawl in the notch engaging position.

The handle tool must be manually held in engagement with the handle engaging member and against the tension of the flexed spring bar with one hand while the other hand manipulates the cotter pin into the aligned apertures to lock the pawl in the latched position. Furthermore, when the hinge member is rotated to the lower position the user must manually remove the cotter pin and unlatch the pawl with one hand while the other hand holds the tool against the tension of the chain by the flexed spring bar.

SUMMARY OF THE INVENTION

Accordingly, it is a primary object of the present invention to simplify the operation of a lift unit for a weight distributing trailer hitch.

It is another object of the present invention to enable a user to use two hands on a handle tool to raise the hinge member of a lift unit against the chain tension by eliminating the need to manually insert or remove a locking pin in order to lock or release a locking pawl for movement between engaged and disengaged positions. A locking pawl for movement between engaged and disengaged positions.

It is yet a further object of the present invention to provide for automatic latching and unlatching of a locking pawl in a lift unit for a weight distributing trailer hitch.

It is still a further object of the present invention to provide a lift unit for a weight distributing trailer hitch that is more durable, has fewer components and is more reliable to operate.

These and other objects and advantages of the present invention are achieved as described herein by an improved lift unit for a weight distributing trailer hitch which includes a fixed mounting bracket, a lift bracket provided with a tool engagement member configured to receive a handle tool, and a pivoting locking pawl pivotally connected to the chain bracket with an upper arm portion of the pawl extending above its pivot connection and adjacent the handle engagement member to provide a tool engagement portion and an elongated lower arm portion for locking engagement with a detent member on the fixed mounting bracket when the lift unit is in the latched position.

More particularly the improved lift unit of the present invention is used to release chain tension from a spring bar of a weight distributing hitch by sliding a handle tool with a cavity at one end into engagement with the handle hook or a tool engagement projection of the chain lift bracket. As the handle is forced into engagement with the handle hook, the end of the handle engages the upper arm portion of the pawl and causes its lower arm portion to pivot clear of the detent member on the fixed mounting bracket so that the lift bracket can be lowered with the aid of the handle using both hands on the handle tool to maintain control while the tension of the lift chain is released.

In one embodiment, the bracket is a generally A-shaped configuration with canted legs. The pawl is mounted on one of the canted legs such that its upper arm extends adjacent to the handle engagement member and the lower arm cants outwardly to be engageable to the detent member.

The lift unit is operated from an unlatched to a latched position by slidably inserting the end of the handle tool about the handle engagement member of the lift bracket and pushing the end of the handle tool against the upper portion of the locking pawl which is thereby maintained in the unlatched position while the chain lift bracket is raised upward and pivoted over center into a latched position. When the handle tool is withdrawn from the handle engagement member and the upper arm portion of the pawl, gravity acts on the elongated lower arm portion of the locking pawl allowing it to pivot downward into engagement with the detent member on the fixed frame bracket to maintain the lift unit in the latched position.

Various other objects and advantages of the present invention will become readily apparent to those skilled in the art from the following description and drawings of the preferred embodiment of the invention.

BRIEF DESCRIPTION OF THE DRAWINGS

FIGS. 5–8 are fragmented perspective views showing the lift unit of FIG. 1 being operated from an unlatched position to a latched position using the aid of a handle tool; and FIGS. 9–11 are fragmented perspective views showing the lift unit of FIG. 1 being operated from a latched position toward an unlatched position using the aid of a handle tool for releasing the tension of the spring bar chain.

DESCRIPTION OF THE PREFERRED EMBODIMENT

Figure 1:
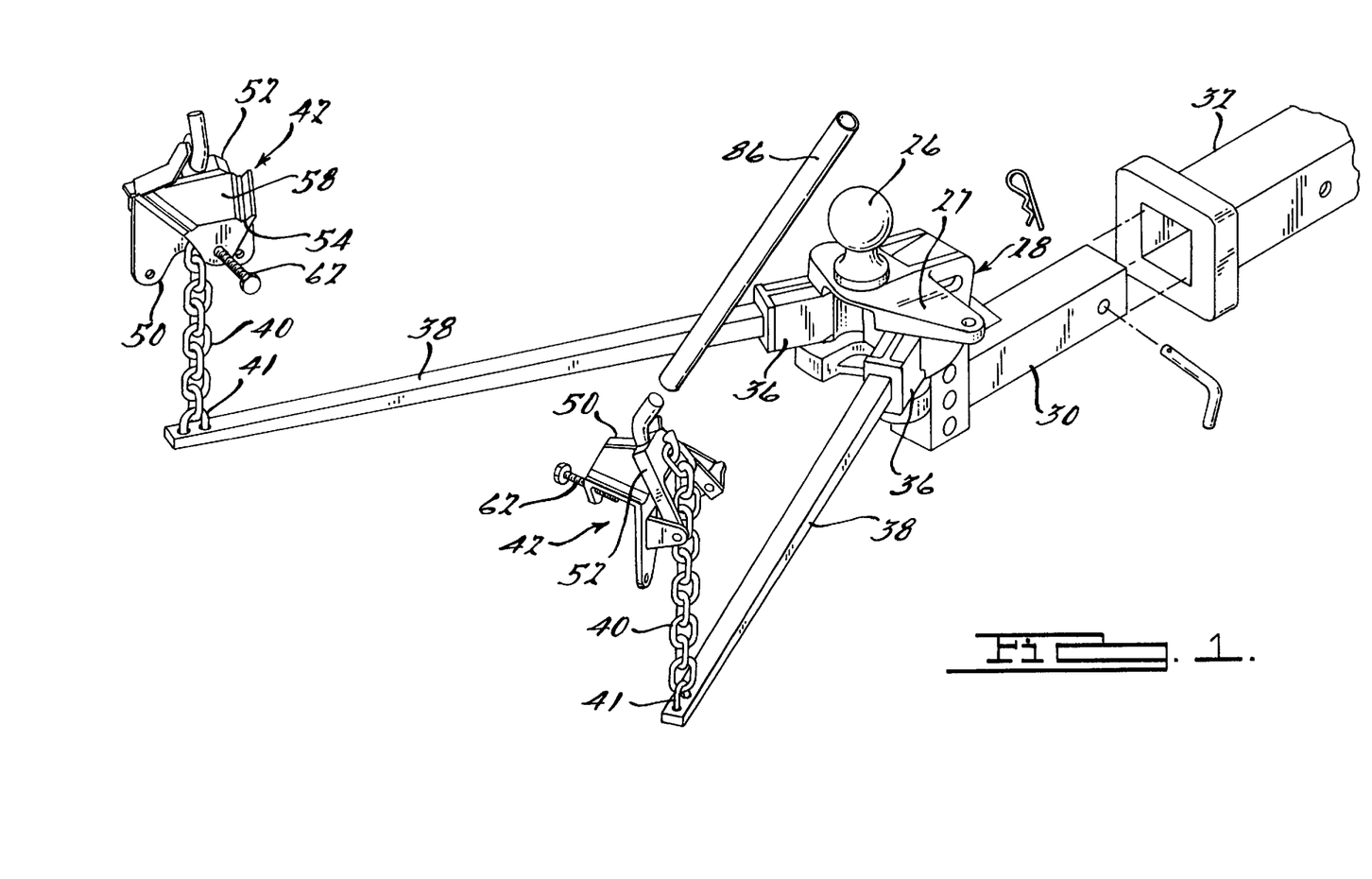
FIG. 1 is a partial perspective view of the lift unit for a weight distributing hitch of the present invention.
Figure 2:
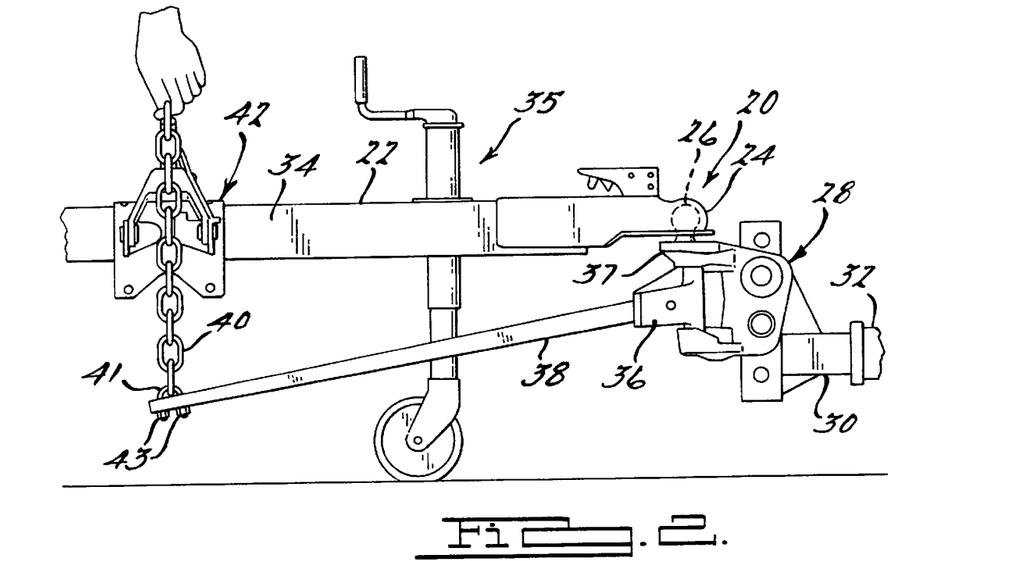
FIG. 2 is a partial right side elevation view of a weight distributing trailer hitch mounted to a trailer hitch receiver while the spring bar lift chain is held in a vertical position to adjust the mounting position of the lift unit of the present invention along the trailer tongue frame coupled to the trailer hitch.

FIGS. 1 and 2 show a weight distributing trailer hitch assembly 20 for coupling a towing vehicle, such as a truck, sport utility vehicle, van or automobile with a towed vehicle such as a trailer. The towed vehicle or trailer includes a forward end that is releasably secured about a hitch ball 26 mounted to a weight distributing hitch assembly 28 mounted to the towing vehicle.

The weight distributing hitch assembly 28 includes a shank 30 of square cross-section that is inserted into a trailer hitch receiver 32 that is attached to the towing vehicle.

The trailer tongue comprises a pair of frame members 34, which typically are rectangular or channel shaped and that extend from laterally spaced locations of the trailer frame toward convergence proximate the coupling 24. While only one side is shown in FIG. 1, it should be appreciated that the view of the other side is essentially similar.

FIGS. 1 and 2 further show the weight distributing hitch assembly 28 including a spring bar 38 with a forward end connected via a trunnion 36 to a ball mount hitch head 37. For a detailed description of the weight distributing hitch assembly 28 and the installation of the spring bar 38 into the hitch head 37 please refer to copending application Ser. No. 60/029,361 filed Oct. 28, 1997 and entitled Weight Distributing Hitch Assembly. A lift chain 40 is attached at its lower end to the rearward distal end of the spring bar 38 by a U-bolt 41 and locking nuts 43.

The upper end of chain 40 is connected via a lift unit assembly 42 secured to the tongue frame member 34. In order to determine the proper mounting position along the length of the frame member 34 for mounting the lift unit 42, the installer pulls the upper end of the chain 40 upward to a vertical position as shown in FIG. 1 while the lift unit assembly 42 is positioned on the frame member 34 such that the lift unit assembly 42 is centered laterally relative to the chain 40. The pivot connection of the trunnion 36 to the hitch head 37 permits the spring bar 38 to travel in a generally horizontal arc about the axis of this trunnion pivot connection and yet to be flexed in a generally cantilever fashion by the upward force exerted on its distal end by action of the tension applied to the chain 40 by the lift unit assembly 42. Thus, the spring bar 38 distributes excess weight from the rear axle of the towing vehicle and distributes it to the front wheels of the towing vehicle and the trailer wheels. If desired a trailer tongue jack 35 can be used to support the tongue weight until after both of the spring bars 38 have been hooked up with the lift unit assemblies 42 secured in their fully raised and latched position as will be described below.

Figure 3:
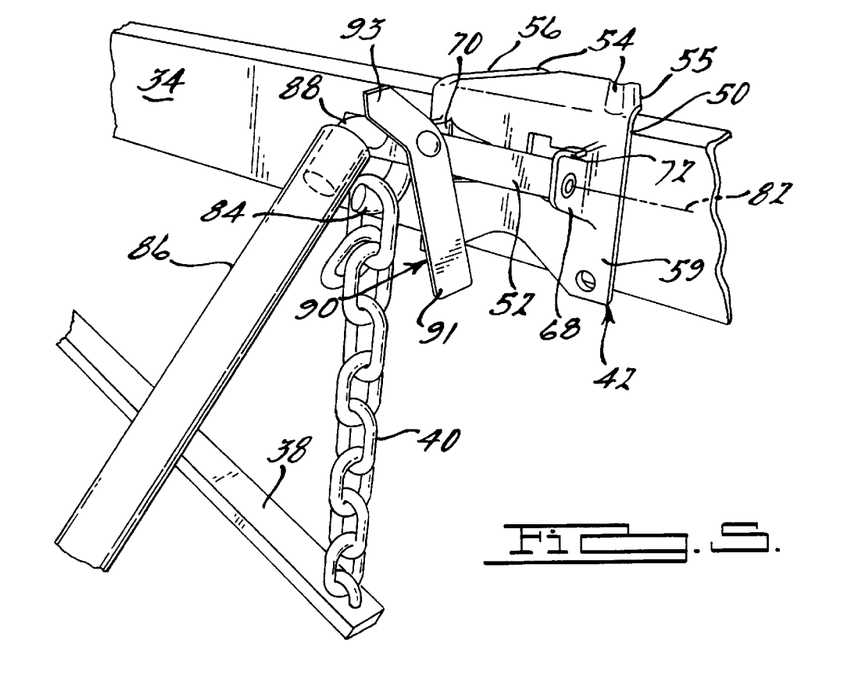
FIG. 3 is an enlarged right side elevation view of the lift unit of the present invention showing the lift unit in full chain elevating position.
Figure 4:
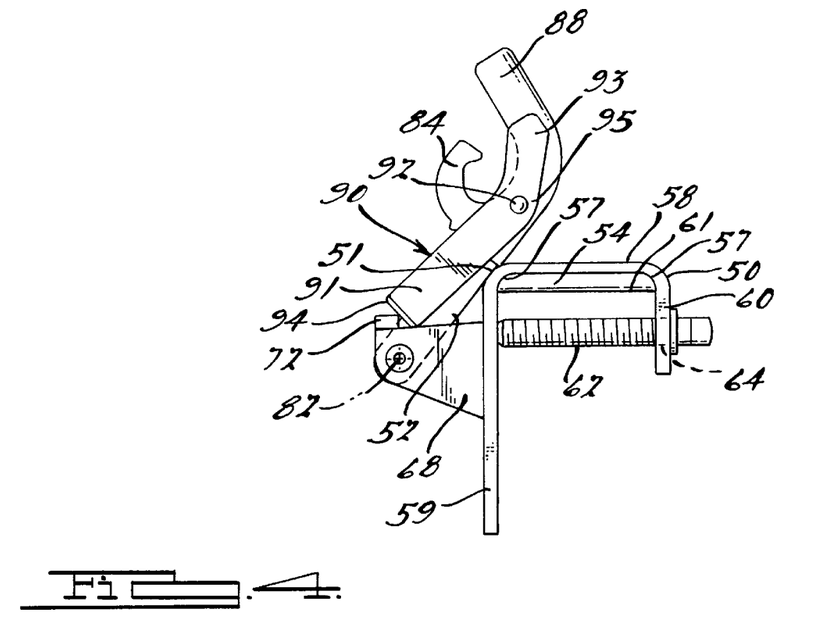
FIG. 4 is a front elevation view of the lift unit of FIG. 3.

Referring to FIGS. 3 and 4, the lift unit 42 includes a mounting bracket 50 and a chain lift bracket 52. The mounting bracket 50 is stamped from a single piece of metal such as steel of suitable thickness. The mounting bracket 50 includes a top 58, a first side 59 and an opposed, spaced apart second side 60, and is configured to fit over the top of frame member 34 with the first side 59 disposed against the outboard side of frame member 34 and the second side 60 disposed facing the inboard side of frame member 34. The mounting bracket 50 is securely attached in the selected position on frame member 34 by a bracket screw 62 that is threaded into a threaded hole 64 centrally located in the second side 60 and tightened against the inboard side of frame member 34. A downwardly facing reinforcement rib 54 is stamped into the top 58 adjacent the front and rear edges 55, 56 of the top 58. The front and rear edges 55, 56, respectively, taper toward each other from adjacent the first side 59 to adjacent the second side 60. The ribs 54 add structural integrity to the mounting bracket 50 and present a straight edge 61 (FIG. 4) between the inboard surfaces of the first and second sides 59, 60 so that the top 58 fits flush on the top surface of the frame member 34 notwithstanding the radius of the inner corners 57 between each of the first side 59 and second side 60 and top 58 resulting from stamping and bending the mounting bracket 50 from a single piece of metal.

A pair of parallel, spaced apart right and left arms 68, 70, respectively extend outwardly from the first side 59 of the mounting bracket 50. The right arm 68 includes a detent member 72 comprising a generally horizontally projecting tab bent to the right side of the arm 68. The function of the detent tab 72 will be explained below.

The lift bracket 52 is preferably cast from ductile iron into a generally A-shaped configuration with a base portion 73 from which opposed, spaced apart legs 74, 76 extend downwardly. The legs 74, 76 are dimensioned and configured at their distal ends to fit closely inside the right and left arms 68, 70 of the mounting bracket 50. The distal end portions of the arms 68, 70 and legs 74, 76 have aligned apertures through which pivot pins 78 and 80 are riveted to provide a generally horizontal pivot axis 82 about which the lift bracket 52 pivots relative to the fixed mounting bracket 50.

A chain hook 84 extends outwardly from the outboard center of the base portion 73 of the lift or chain bracket 52. This hook 84 is used for attachment of chain 40 to the lift unit 42. A relatively thicker finger 88 extends upwardly and outwardly from the top center of the base portion 73 of the chain bracket 52. Both the chain hook 84 and the finger 88 are integrally cast appendages of the chain bracket 52. Because the flexing of the spring bar 38 by the lift unit 42 imposes a substantial tension force through the chain, pivoting of the hinged chain bracket 52 relative to the fixed mounting bracket 50 is aided by use of a tool 86 having one hollow end configured to slidably telescope about the outwardly projecting finger 88 to act as a lever to facilitate operation of the lift unit 42 both in raising and lowering the lift chain 40 which is under tension from the cantilevered spring bar 38. The tool 86 preferably is a pipe whose inner diameter is slightly larger than the outer diameter of the finger 88.

A gravity-responsive locking pawl 90 is pivotally connected to the right side 75 of the base portion 73 of the chain bracket 52. The locking pawl 90 cooperates with the detent tab member 72 of the fixed mounting bracket 50 to maintain the lift chain bracket 52 in the fully elevated over center position as seen in FIGS. 1, 3–4 and 8–9. The locking pawl 90 is preferably a flat metal part having an elongated generally rectangular lower arm portion 91 and a shorter upper arm portion 93 angled upwardly and outwardly from the lower arm portion 91. The rotational movement of the locking pawl 90 is achieved by pivotally mounting the locking pawl 90 to the right side 75 of the base portion 73 of the lift bracket 52 by a pivot member such as a drive screw 92 that passes through aligned holes in the right side 75 of the chain lift bracket 52, and in the locking pawl 90 at an elbow 95 between the lower arm portion 91 and the upper arm portion 93. Thus, unless acted upon by the tool 86 or engaged with the detent tab member 72, gravity will cause the elongated lower arm portion 91 of the locking pawl 90 to hang generally downward as seen in FIG. 5.

FIG. 4 shows the lift unit 42 in full chain elevating position with the lower arm portion 91 of the pawl 90 pivoted by gravity to a position where the bottom edge 94 abuts the detent tab member 72. Any undesired movement of the chain bracket 52 counterclockwise as viewed in FIG. 4 is prevented by the abutting engagement of the bottom edge 94 with the detent tab member 72 thereby keeping the chain bracket in the full chain elevating position shown in FIG. 4.

Referring to FIGS. 5–8 the operation of the lift unit 42 to hook up the spring bar 38 by raising the chain 40 will now be described. With the chain lift bracket 52 lowered to the position shown in FIG. 5 by the aid of tool 86 engaged with the finger 88, a selected link of the chain 40 is slipped onto the chain hook 84. It should be noted that in this position, the locking pawl 90 pivots with its lower arm 91 hanging generally downward.

Figure 6:
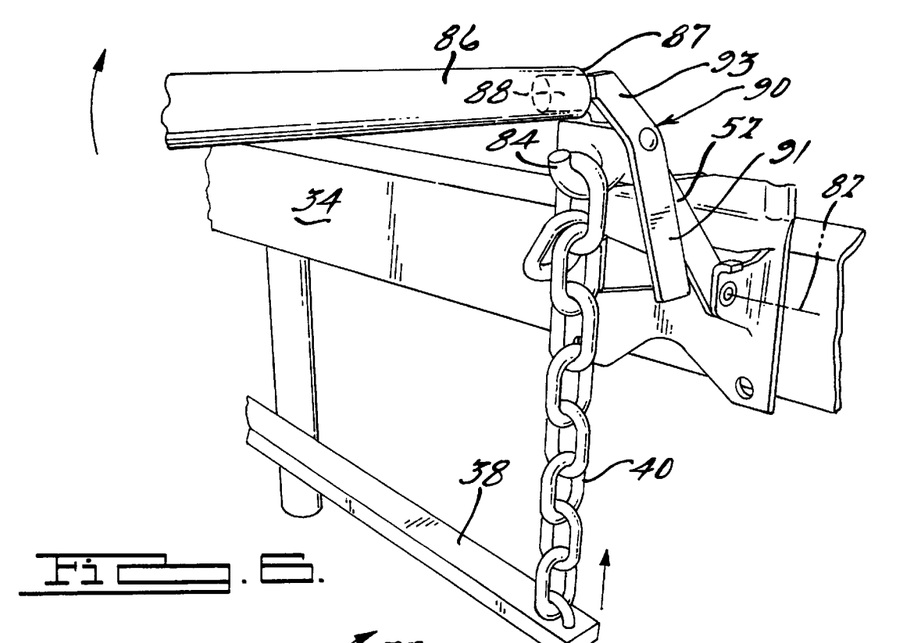
Figure 7:
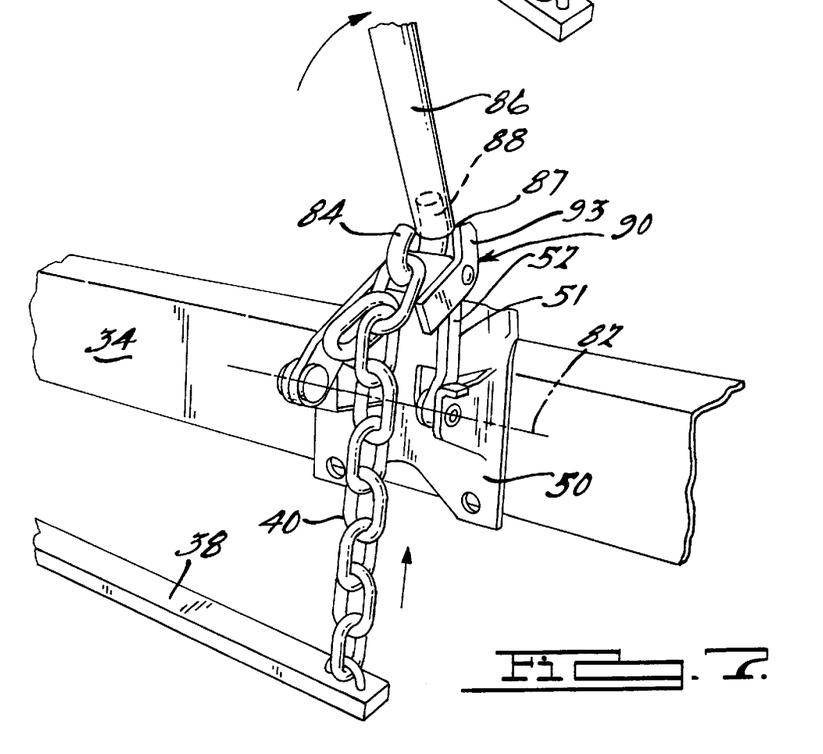

As the chain bracket 52 is raised via the tool 86 the chain lift bracket 52 pivots about axis 82 in a clockwise direction as viewed in FIG. 6 while the position of the locking pawl 90 remains substantially unchanged until the end 87 of the tool 86 engages a top edge 96 of the locking pawl 90 as seen in FIG. 6. Continued rotation of the chain bracket 52, with the tool 86 engaging both the finger 88 and the top edge 96 of the upper arm portion 93 of the locking pawl 90, causes its lower arm 91 to swing up to a raised position as shown in FIG. 7 as the chain lift bracket 52 goes over center with respect to the chain 40 so that the force executed on the chain lift bracket 52 by the tension of the chain 40 will urge the chain lift bracket 52 to continue to rotate in a clockwise direction as viewed in FIG. 7 until the inboard side of the chain lift bracket 52 abuts the outboard top corner 51 (see FIG. 3) of the fixed mounting bracket 50. This prevents further clockwise rotation of the chain lift bracket 52 which comes to rest in a full chain elevating position.

Figures 8, 9:
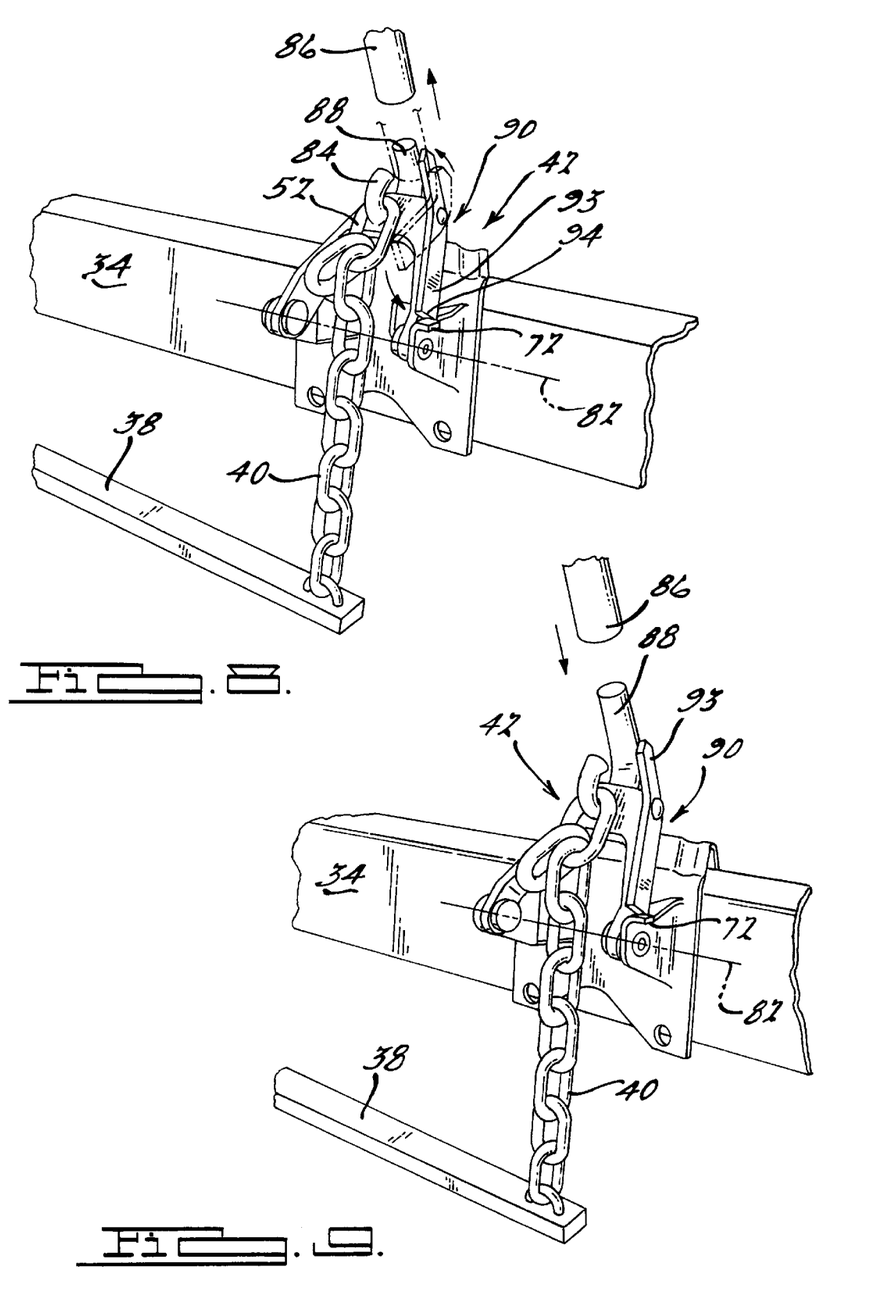

Referring to FIG. 8, with the chain lift bracket 52 in the fully raised and over center chain elevating position the tool 86 is withdrawn from both the finger 88 and the top edge 96 of the upper arm portion 93 of the locking pawl 90. This allows the locking pawl 90 to pivot in response to gravity and the lower arm 91 to swing downwardly with its bottom edge 94 dropping into abutting engagement with the detent tab member 72. The locking pawl 90 is then in its latched position. This prevents inadvertent rotation of the chain lift bracket 52 in a counterclockwise direction as viewed in FIGS. 3 and 8 and prevents loss of tension in the chain 40 and unflexing of the spring bar 38.

The lift unit 42 mounted on the other tongue frame member 34 is operated in the same manner as described above to hook up the lift chain 40 connected to the other spring bar 38.

Figure 10:
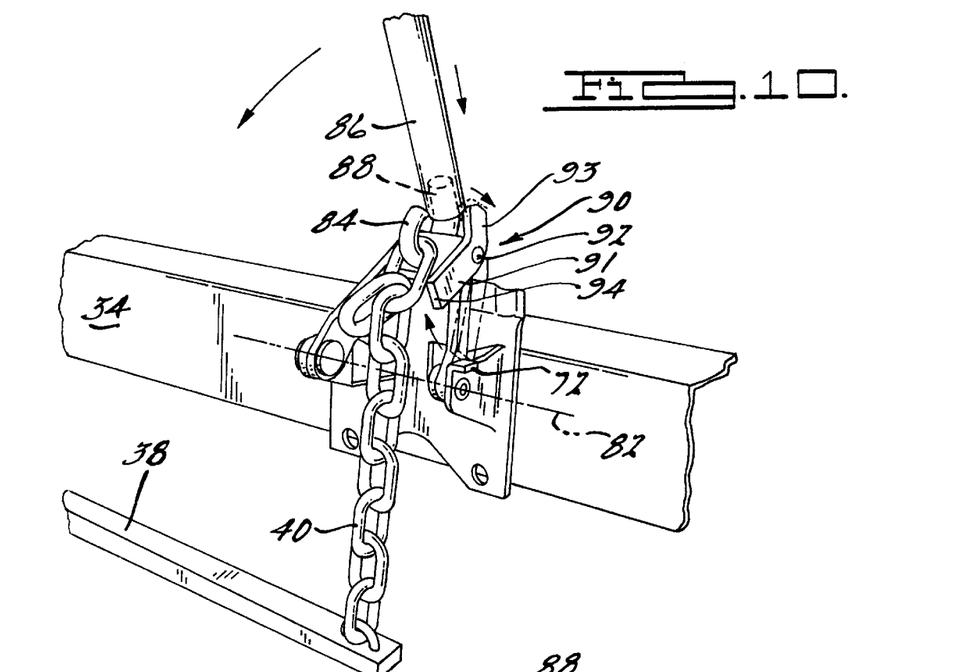
Figure 11:
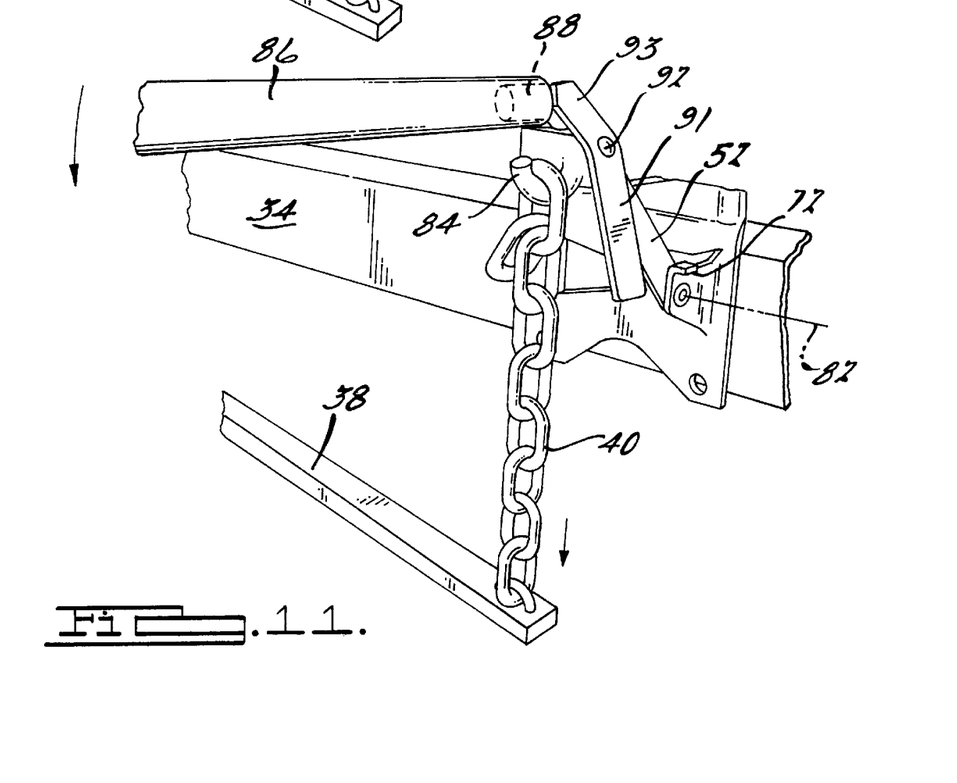

Referring now to FIGS. 9–11 the operation of the lift unit assembly 42 to lower the chain lift bracket 52 and chain 40 and thereby allow the spring bar 38 to relax will now be described. With the chain lift bracket 52 in the fully raised and over center chain elevating position shown in FIG. 9, and the locking pawl 90 in the latched position by engagement of the pawl 90 with the detent member 72, the tool 86 is pushed onto the upwardly and outwardly projecting finger 88. It should be noted that when the locking pawl 90 is in the latched position its upper position 93 is disposed adjacent the base of finger 88.

As the tool 86 is pushed down over the tool engagement finger 88, the lower edge 87 of the tool 86 abuttingly engages the upper end of the upper arm 93 of the locking pawl 90 and forces the locking pawl 90 to pivot about pivot pin 92. This disengages the bottom edge 94 of locking pawl 90 from the detent 72 and swings the lower arm portion 91 in an outward and upward direction causing the locking pawl 90 to move from the latched position shown in phantom in FIG. 10 to an unlatched position.

The chain lift bracket 52 may then be rotated in a counterclockwise direction as shown in FIG. 11 with the tool 86 still disposed about the finger member 88 and in abutting engagement with the upper arm portion 93 while maintaining the pawl 90 in an unlatched position. This lowers the chain 40 which is held by chain hook 84 and releases the tension of the spring bar 38.

The lift unit 42 mounted on the other tongue frame member 34 is operated in the same manner as described above to lower the chain 40 connected to the other spring bar 38.

Thus, the lift unit assembly 42 of the present invention provides for automatic disengagement of the locking pawl 90 while allowing the operator to keep both hands on the tool 86. This eliminates the need for the operator to hold the tool with one hand to overcome the forces on the lift unit 42 under the tension of the chain 40 by the spring bar 38 while at the same time manually unlocking a tethered locking pin from the locking pawl and further manually unlatching the locking pawl so that the chain bracket can be rotated to lower the chain.

Various modifications of the above described preferred embodiment will be readily apparent to those skilled in the art without departing from the spirit or scope of the invention and the following claims.

We claim:

1. A weight distributing trailer hitch having a spring bar for distributing weight between a towing vehicle and a trailer having a trailer tongue, and a lift unit, said lift unit comprising:

a mounting bracket for attachment to said trailer tongue;

a lift bracket rotatably connected to said mounting bracket for motion between a lowered and raised position and operably connected to said spring bar for raising and lowering said spring bar, said lift bracket including a locking pawl connected to said lift bracket for releasably latching the lift bracket in a raised position to maintain a desired tension on said spring bar, said lift bracket including a handle engagement member adapted to engage a removable handle to aid in rotation of said lift bracket upon movement of said handle while said handle is engaged with said handle engagement member;

a locking pawl including a lower portion adapted for engagement with a detent provided on said mounting bracket and an upper portion angled outwardly from said lower portion;

said outwardly angled upper portion of said locking pawl adapted to engage said handle upon engagement of said handle with said lift bracket handle engagement member to automatically release said locking pawl and unlatch said lift bracket to permit rotation of said lift bracket with the aid of said handle from the raised position to the lowered position to lower said spring bar.

2. A weight distributing trailer hitch having a spring bar for distributing weight between a towing vehicle and a trailer having a trailer tongue and a lift unit, said lift unit comprising:

a mounting bracket for attachment to said trailer tongue;

a lift bracket rotatably connected to said mounting bracket for motion between a lowered and raised position and operably connected to said spring bar for raising and lowering said spring bar to flex and unflex said spring bar;

said lift bracket including a locking pawl pivotably connected to said lift bracket for releasably latching said lift bracket in a raised position to flex said spring bar, said lift bracket including a tool engagement projection configured to slidably engage a tool removably engaged with said projection to assist in rotation of said lift bracket;

said locking pawl including an upper arm portion and a lower arm, said upper arm portion angled outwardly from said lower arm and said angled upper arm portion disposed proximate said tool engagement projection so that upon slidable engagement by said tool with said tool engagement projection, said tool also engages said outwardly angled upper arm portion to unlatch said lift bracket to permit rotation of said lift bracket to lower and unflex said spring bar.

3. A weight distributing trailer hitch as defined in claim 1, said lift unit further comprising:

said lift bracket being generally A-shaped with two legs canted from a central base portion to distal ends pivotably mounted to the mounting bracket;

said handle engagement member extends from said central base portion;

said locking pawl pivotably mounted on one of said legs and said locking pawl canted to have its angled upper portion disposed adjacent said handle engagement member while said lower portion is in engagement with said detent on said mounting bracket.

4. A weight distributing trailer hitch as defined in claim 2, said lift unit further comprising:

said lift bracket being generally A-shaped with two legs canted from a central base portion to distal ends pivotably mounted to the mounting bracket;

said tool engagement projection extending from said central base portion;

said locking pawl pivotably mounted on one of said legs and said locking pawl canted to have its angled upper arm portion in proximity to said tool engagement projection and said lower arm engageable with a detent member on said mounting bracket.

* * * * *